United States Patent
Li et al.

(10) Patent No.: US 7,933,566 B2
(45) Date of Patent: Apr. 26, 2011

(54) CORDLESS PHONE DETECTION IN 2.4 GHZ FOR INTERFERENCE MITIGATION

(75) Inventors: Hongxiang Li, Seattle, WA (US); Srikathyayani Srikanteswara, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 878 days.

(21) Appl. No.: 11/742,213

(22) Filed: Apr. 30, 2007

(65) Prior Publication Data
US 2008/0267275 A1 Oct. 30, 2008

(51) Int. Cl.
*H03C 1/62* (2006.01)
(52) U.S. Cl. ............ 455/115.1; 455/115.3; 455/115.4; 455/226.1
(58) Field of Classification Search .......... 455/115.1, 455/115.3, 115.4, 226.1
See application file for complete search history.

(56) References Cited

U.S. PATENT DOCUMENTS

| 2002/0105930 A1* | 8/2002 | Sydon et al. ............ 370/337 |
| 2003/0224741 A1* | 12/2003 | Sugar et al. ............ 455/115.1 |
| 2004/0028003 A1* | 2/2004 | Diener et al. ............ 370/319 |

OTHER PUBLICATIONS

Aiake "Power Spectrum Estimation through Autoregressive Model Fitting," Ann. Inst. Statist. Math., vol. 21, pp. 407-419, 1969.*

* cited by examiner

*Primary Examiner* — Patrick N Edouard
*Assistant Examiner* — Michael Irace
(74) *Attorney, Agent, or Firm* — Carrie A. Boone, P.C.

(57) ABSTRACT

A system and method for determining whether sampled spectrum data comes from a cordless phone is disclosed. The system includes a device to detect the sampled spectrum data and an algorithm to analyze the sampled spectrum data. The algorithm separates the narrowband components from the wideband components of the sampled spectrum data, then classifies the sampled spectrum data based on the bandwidth, frame length, and inter-frame time, as either being an analog or digital FM phone, a DSSS phone, a WDCT phone, or a non-cordless phone, such as a Bluetooth device. The algorithm may be used for interference mitigation.

20 Claims, 8 Drawing Sheets

CORDLESS PHONE DETECTION IN 2.4 GHZ FOR INTERFERENCE MITIGATION

FIELD

This disclosure relates to wireless communications and, more particularly, to interference mitigation in wireless networks.

BACKGROUND

A wireless local-area network, or WLAN, consists of a number of nodes, known as access points (APs) and stations. The nodes communicate with one another according to some predefined standard, e.g., Institute of Electrical and Electronic Engineers (IEEE) 802.11 standard.

Some of these wireless devices may operate at 2.4 Giga-Hertz (GHz). Cordless phones, microwave ovens, and Bluetooth devices, are all known to operate at this frequency. Thus, these devices can cause interference in WLAN systems.

Where such potential sources of interference are detected, their effects may be limited through interference mitigation.

BRIEF DESCRIPTION OF THE DRAWINGS

The foregoing aspects and many of the attendant advantages of this disclosure will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION OF THE PREFERRED EMBODIMENTS

In accordance with the embodiments described herein, an algorithm to detect cordless phones that operate in the 2.4 GHz spectrum is disclosed. The algorithm may detect narrowband FM, DSSS and FHSS (WDCT) phones with other narrowband/wideband signal superimposed in both time and frequency. The algorithm, designed to operate with "time-sliced" data, relies on the sampled spectrum data, and thus, no cordless phone receiver is needed.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

Figure 1:
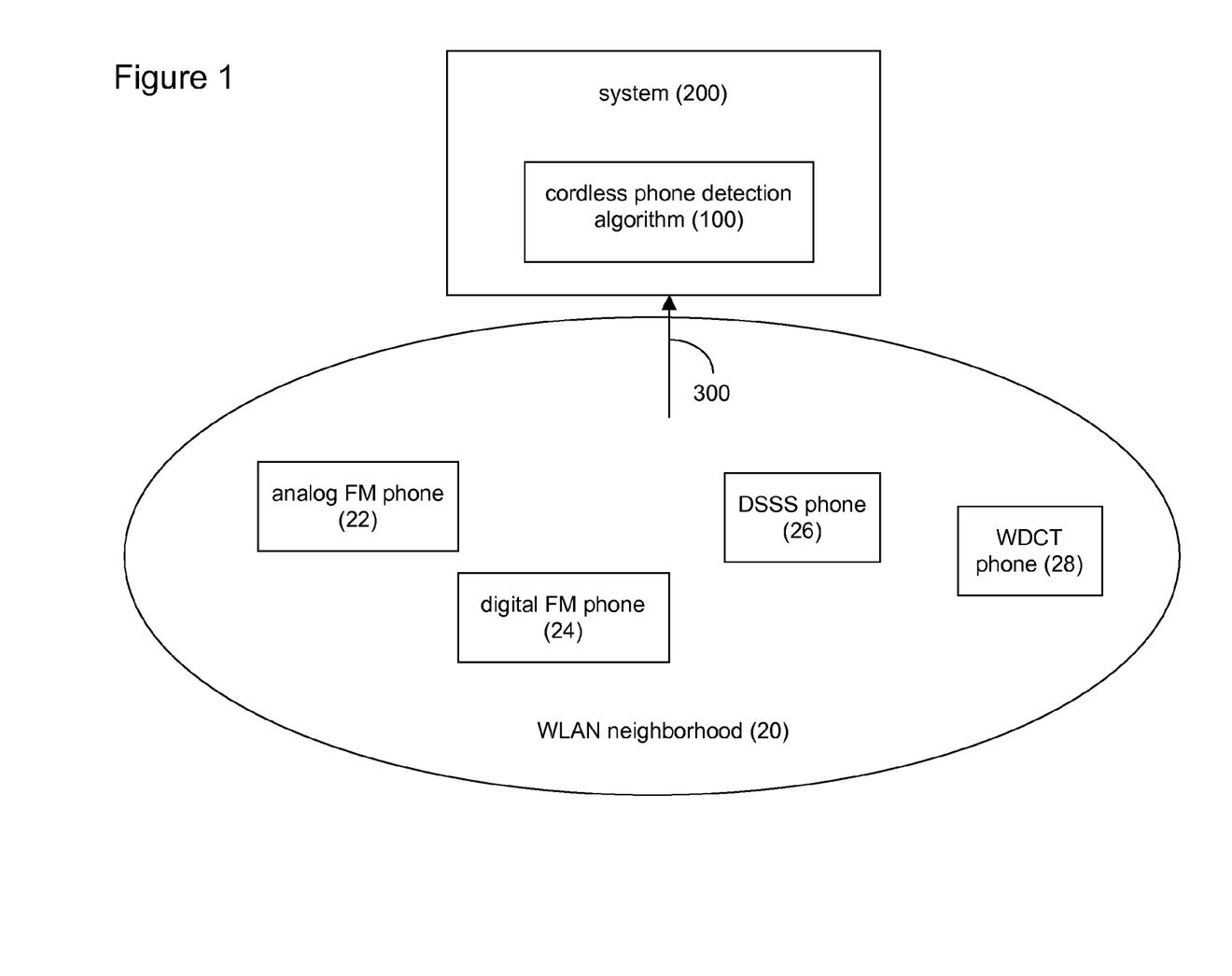
FIG. 1 is a block diagram of a cordless phone detection algorithm, according to some embodiments.

A cordless phone detection algorithm 100 is depicted schematically in FIG. 1, according to some embodiments. As described further, below, the cordless phone detection algorithm 100 is capable of detecting cordless phones that operate in the 2.4 GHz spectrum, with other narrowband/wideband signal superimposed in both time and frequency. Such phones include narrowband frequency modulation (FM) phones, such as analog FM phones 22 and digital FM phones 24, as well as direct sequence spread spectrum (DSSS) phones 26, and worldwide digital cordless telecommunications (WDCT) phones 28.

Figure 8:
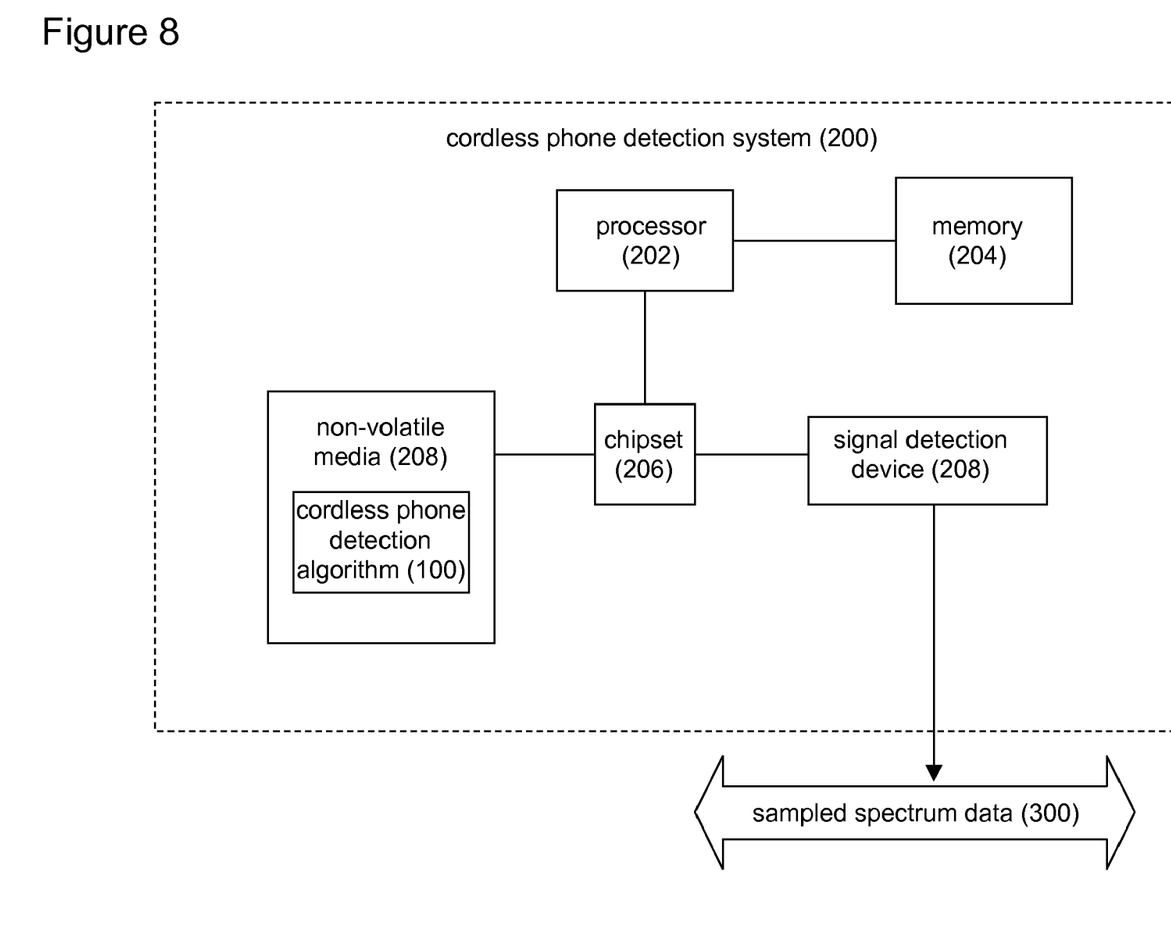
FIG. 8 is a diagram of a processor-based system using the cordless phone detection algorithm of FIG. 1, according to some embodiments.

The algorithm 100 operates in conjunction with, and may be part of, a system 200 capable of detecting sampled spectrum data 300. The spectrum data is called "sampled" because, instead of continuously detecting the spectrum data, the data is sampled, or time-sliced. This enables the algorithm 100 to be used in operating environments where there is not an unlimited availability of storage, such as memory buffers, for storing the data. The system 200 may be any of a variety of hardware systems known to one of ordinary skill in the art for performing signal detection. In FIG. 8, below, the system 200 is depicted as a processor-based system. In some embodiments, the system 200 is part of a WLAN device that includes hardware for detecting the sampled spectrum data 300. The algorithm 100 analyzes the sampled spectrum data 300, without further processing of the data.

During detection, the algorithm 100 obtains the sampled spectrum data 300, which has both narrowband and wideband components. The algorithm 100 separates the narrowband components from the wideband components. Then, the algorithm 100 classifies the sampled spectrum data 300 based on bandwidth, frame length, and inter-frame time. The source of the sampled spectrum data 300 may be an analog FM phone 22, a digital FM phone 24, a DSSS phone 26, a WDCT phone 28, or none of these.

In some embodiments, the algorithm 100 is a software program executed on a processor-based system (see FIG. 8, below), such as a WLAN device. The algorithm 100 may be implemented wholly in software, or may be implemented using hardware or a combination of software and hardware. System designers and software programmers of ordinary skill in the art recognize a myriad of techniques in which an algorithm may be practically implemented. This disclosure is not limited to a particular implementation of the algorithm 100.

Table 1 includes a list of the four types of phones that are detected by the algorithm 100. Included are characteristics, including frame length, spectrum, and duplex, for each type of phone. The algorithm 100 uses these characteristics to detect each type of phone. The WDCT phone 28 is a proprietary standard of Siemens. (Siemens AG is based in Munich, Germany.)

TABLE 1

Phones detected by the cordless phone detection algorithm 100

| phone type | Frame length, $t_f$ | Spectrum | Duplex |
|---|---|---|---|
| analog FM (22) | | static, BW < 0.1 MHz | FDD |
| digital FM (24) | 2 ms | static, BW = 0.2 MHz | TDD |
| DSSS (26) | 2 ms | static, BW = 2 MHz | TDD |
| WDCT (28) | 10 ms | FHSS, BW = 0.86 MHz | TDD |

The analog FM phone 22 has no frame length, a static spectrum with a bandwidth of less than 0.1 MHz, and uses frequency division duplexing (FDD). The digital FM phone 24 has a frame length of 2 milliseconds (ms), a static spectrum with a bandwidth of 0.2 MHz, and uses time division duplexing (TDD). The DSSS phone 26 has a frame length of 2 ms, a static spectrum with a bandwidth of 2 MHz, and uses TDD. The WDCT phone 28 has a frame length of 10 ms, has a frequency hopping spread spectrum (FHSS) with a bandwidth of 0.86 MHz, and uses TDD.

Figure 2:
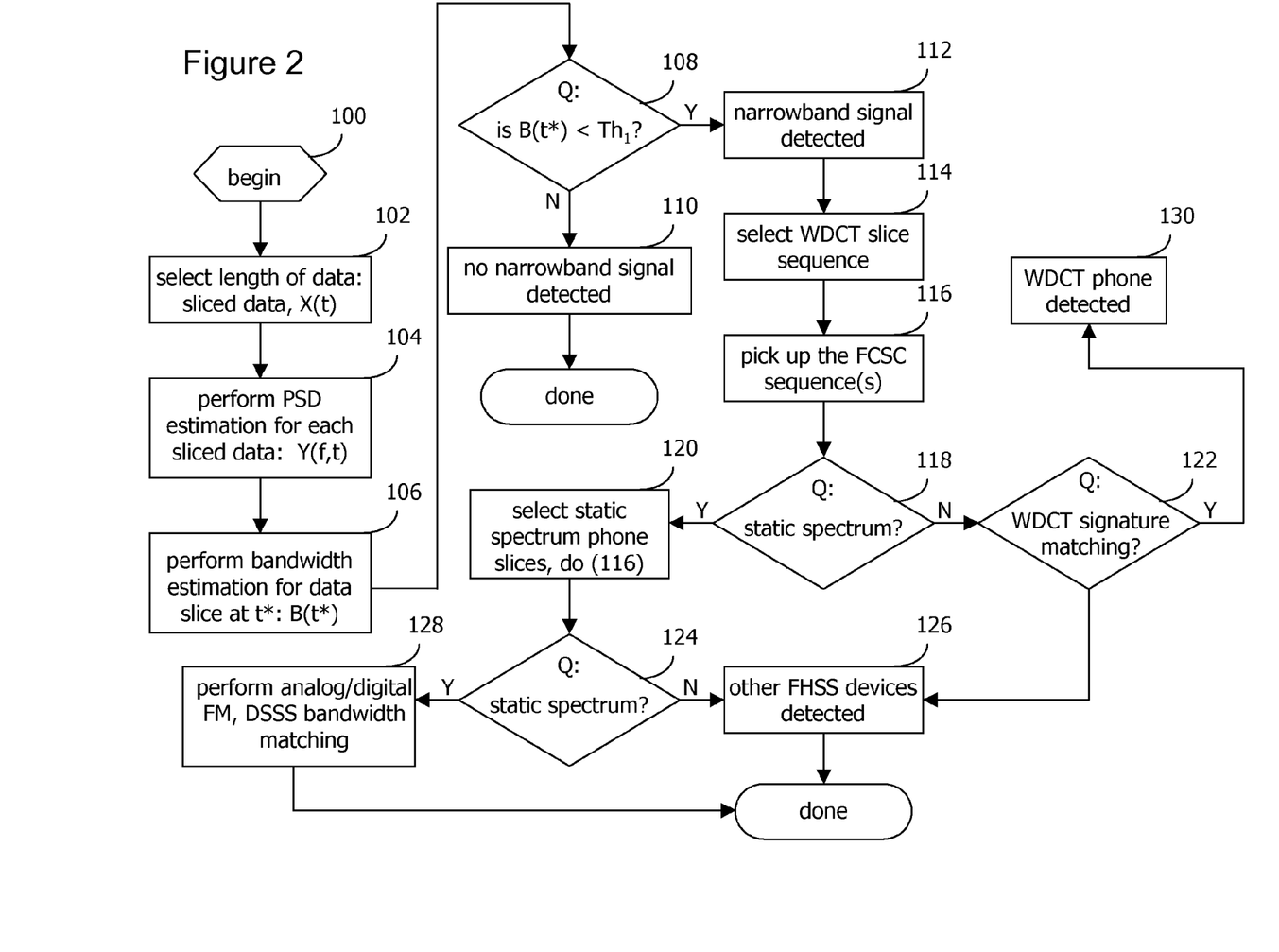
FIG. 2 is a flow diagram of the cordless phone detection algorithm of FIG. 1, according to some embodiments.

In FIG. 2, a flow chart shows operation of the cordless phone detection algorithm 100, according to some embodiments. The algorithm 100 begins by selecting the length of the data (block 102). The length of the data is the time duration of capturing the sampled spectrum data 300. Thus, if the system 200 starts to capture data at time, $t_0$, and finishes capturing the data at time, $t_1$, the data length is $t_1-t_0$. In some embodiments, the system 200 uses a 20 MHz capture bandwidth. The algorithm 100, however, may operate with other capture bandwidths.

Further, in some embodiments, the system 200 has a buffer size constraint, which limits the amount of data that can be captured from the signal 300. Accordingly, the system 200 uses sliced data samples. Thus, the spectrum data 300 is sampled periodically, rather than continuously. The sampled spectrum data is given in FIG. 2 as X(t). In some embodiments, the buffer size of the system 200 is 1 Mb.

The WDCT phone 28 uses FHSS (Table 1). Thus, the WDCT frame hops over the entire 2.4 GHz spectrum (82 MHz), with a hopping rate of 100 hops/second (frame length, $t_f=10$ ms). The probability of any single frame falling into the 20 MHz captured bandwidth is $P_s=20/82=0.24$. Assume the total capture time is T, the following formulas gives $P_0$, the probability of no WDCT frame being captured during time, T, and $P_1$ is the probability of exactly one WDCT frame being captured during time, T, where L is the number of frames contained in T:

$$P_0=(1-P_s)^L \quad (1)$$

$$P_1=L*P_s*(1-P_s)^{L-1} \quad (2)$$

The cordless phone detection algorithm 100 needs more than one WDCT frame for detection. $P_{WDCT}$ is defined herein as the probability of the algorithm being able to perform detection. In a single capture, the probability of more than one WDCT frame being captured during time, T is given by the following formula:

$$P_{WDCT}=1-P_0-P_1 \quad (3)$$

In multiple captures, the probability of at least one capture containing more than one WDCT frame, where K is the total number of captures, is given by the following formula:

$$P_{WDCT}=1-(P_0+P_1)^K \quad (4)$$

Figure 3:
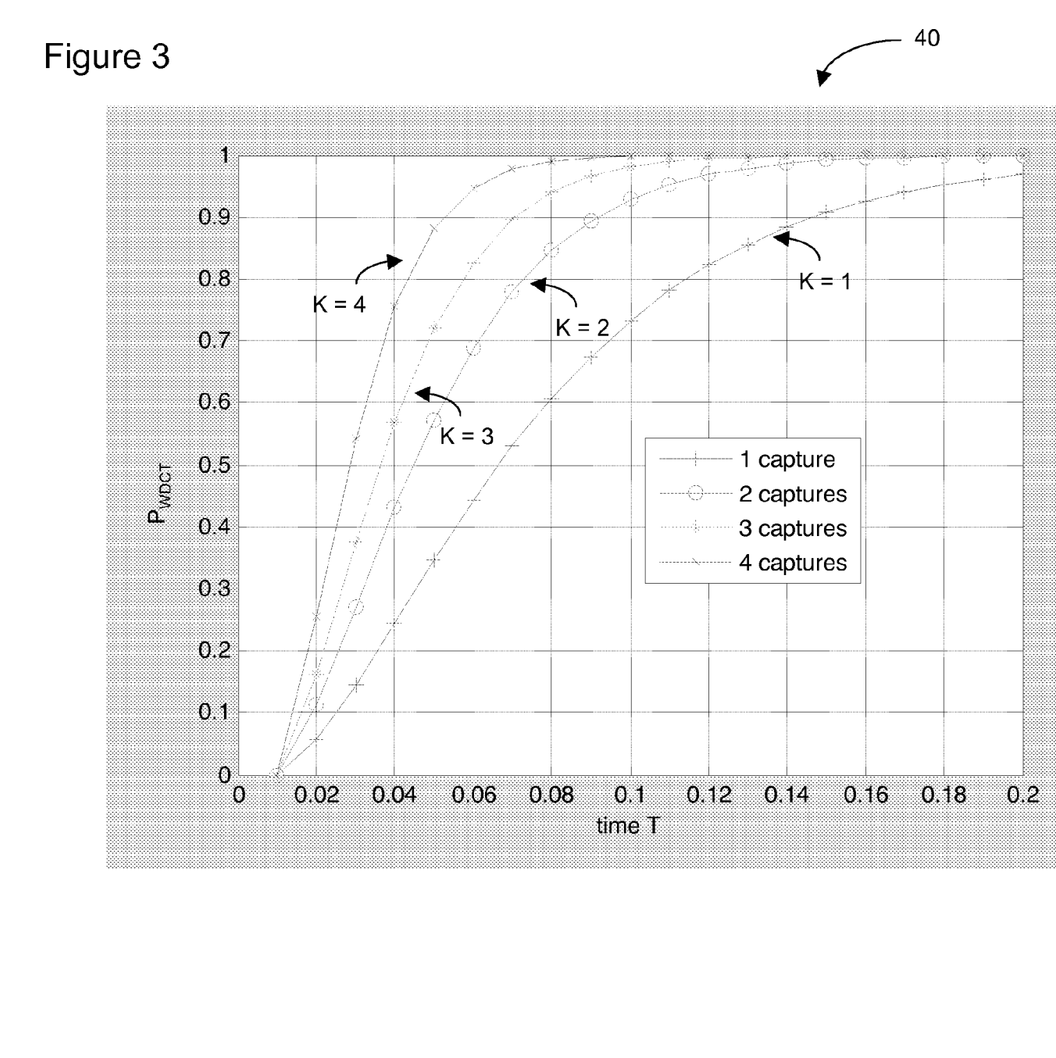
FIG. 3 is a graph showing the probability of detecting a WDCT phone at different times for a different number of captures by the algorithm of FIG. 1, according to some embodiments.

FIG. 3 is a graph 40 show $P_{WDCT}$ at different times, T, for K=1, 2, 3, and 4, according to some embodiments. At time, T=0.1, the probability, $P_{WDCT}$ with K=1 (one capture) is about 0.73; with K=2 (2 captures), $P_{WDCT}$ is about 0.92; with K=3 (three captures), $P_{WDCT}$ is about 0.98; with K=4 (four captures), $P_{WDCT}$ is about 0.99.

Where the system 200 has a total buffer size of one megabyte, the cordless phone detection algorithm 100 may employ one of two "slicing" options:

$$T=100 \text{ ms}, 100 \text{ us every } 500 \text{ us} \quad (5)$$

$$T=100 \text{ ms}, 50 \text{ us every } 500 \text{ us} \quad (6)$$

The first slicing option (5) is characterized by perfect packing, with each slice containing N=2048 points; the second slicing option (6) is characterized by imperfect packing, with each slice containing N=1024 points.

Returning to FIG. 2, using one of these slicing options (5) or (6), the cordless phone detection algorithm 100 obtains the sliced data, X(t) of the sampled spectrum data 300 (block 102). The sliced data is in the time domain.

The algorithm 100, however, analyzes the sliced data, X(t), of the sampled spectrum data 300 in the frequency domain. By analyzing the data 300 in the frequency spectrum, the algorithm 100 is able to measure how much energy exists in each of the frequencies.

From the sliced data, X(t), the algorithm 100 performs a power spectrum density (PSD) estimation for each sliced data, X(t), in the frequency domain, given as Y(f, t) (block 104). The cordless phone detection algorithm 100 may employ one of three techniques to estimate the PSD for each sliced data. A fast Fourier transform (FFT) method may be used. Or, an enhanced FFT method with spectral smoothing may be used. Finally, a parametric method with autoregressive (AR) modeling may be used.

In some embodiments, the cordless phone detection algorithm 100 uses the parametric method with AR modeling to perform PSD estimation of the sliced data, X(t), of the sampled spectrum data 300, in the frequency domain, Y(f, t). Where m is the order of AR modeling, the accuracy of the PSD estimation depends on both N (the number of samples per sliced data) and m. The PSD estimation is obtained for a given time and frequency, and is given by Y(f,t).

The cordless phone detection algorithm 100 picks up the maximum, Y, over the entire time and frequency domain, that is:

$$Y(f^*,t^*)=\max_{f,t}\{Y(f,t)\} \quad (7)$$

where $\max_{f,t}\{Y(f,t)\}$ is the maximum Y(f,t) maximized over both frequency, f, and time, t, where Y(f,t) is the power density spectrum for each slice, X(t), of the sampled spectrum data 300. $\text{Max}_f\{Y(f,t)\}$ fixes the time and searches for a maximum Y(f,t) over the entire frequency. For example, for the data slice, X(t), captured at time, t=1, the algorithm 100 estimates the PSD to get Y(f,1), which is a function of the frequency, f. $\text{Max}_f\{Y(f,1)\}$ is the maximum amplitude of Y among all possible frequencies, f, for a data slice at t=1. If the next data slice is captured at time, t=5, the algorithm 100 estimates the PSD to obtain Y(f,5). $\text{Max}_f\{Y(f,5)\}$ is the maximum amplitude of Y among all possible frequencies, f, for a data slice at time, t=5.

Then, the cordless phone detection algorithm 100 performs bandwidth estimation for the data slice at time, t*, to obtain B(t*) (block 106). If the estimated bandwidth at t* is narrowband, the narrowband signal component at (f*, t*) is from the dominant narrowband interferer (DNI). In addition to DNI, there may be some other narrowband interferer(s) in the sampled spectrum data 300.

For a central frequency estimation of each data slice, either max{Y(f, t)} may be picked up or a centroid method may be applied. The centroid method is described in the paper, "New Methods for Estimating the Center Frequency and the Bandwidth of Clutter" by Ge Fengxiang, Meng Huadong, Peng Yingning, and Wang Xiutan (©2001, IEEE).

Figure 4:
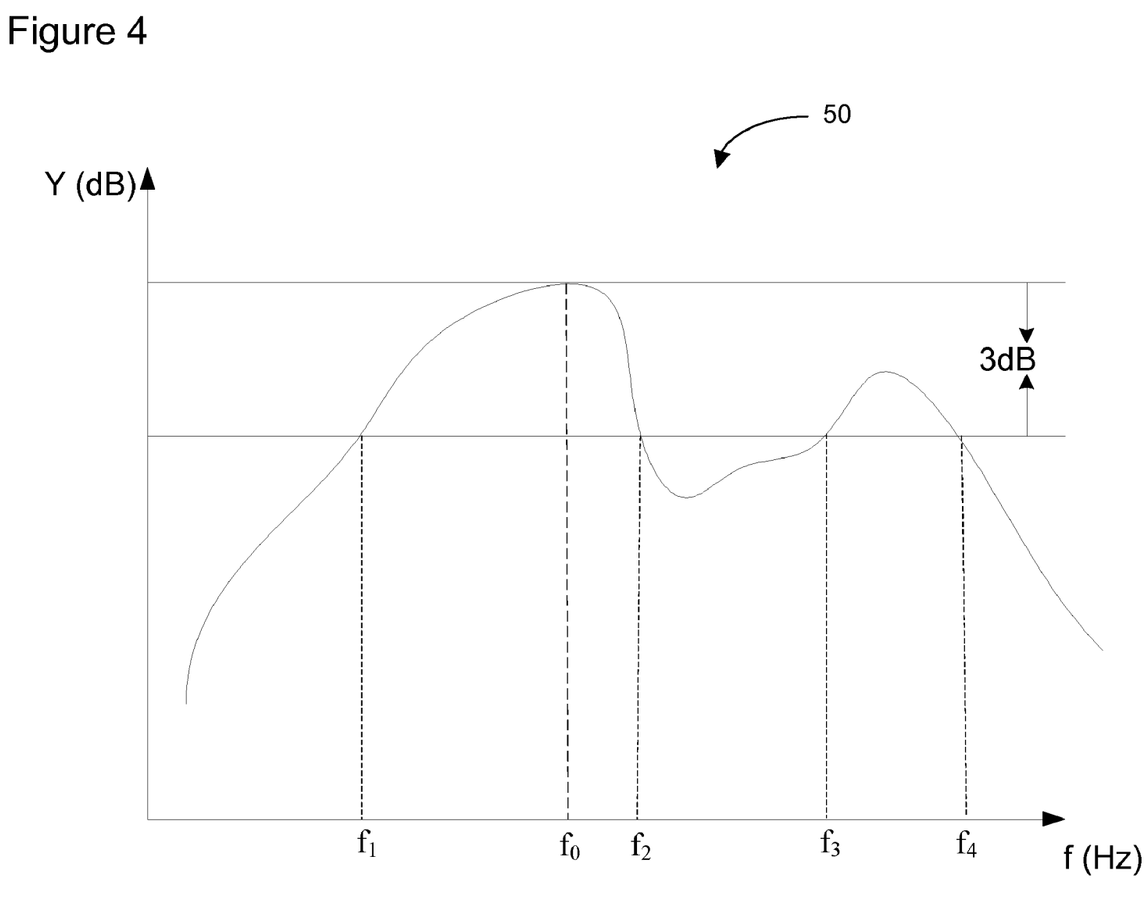
FIG. 4 is a graph illustrating bandwidth estimation techniques used by the algorithm of FIG. 1, according to some embodiments.

For bandwidth estimation, the algorithm 100 looks at the highest point of the PSD, then looks 3 dB below that point. Within the 3 dB bandwidth, the algorithm 100 looks at how wide the spectrum is. The algorithm 100 may employ a minimum distance method ($f_2-f_1$), a maximum distance method ($f_4-f_1$), and/or a sum method ($f_2-f_1$)+($f_4-f_3$). In FIG. 4, a graph 50 shows the frequencies, $f_1$, $f_2$, $f_3$, and $f_4$, as well as the 3 dB window, to illustrate these bandwidth estimation techniques. The graph 50 is a measure of frequency (f) versus power (Y). The central frequency in the graph 50 is $f_0$.

If there is a single narrowband interferer superimposed with wideband signals, the cordless phone detection algorithm 100 uses the sum method, as the sum method has the best performance, in some embodiments, especially in the low signal to noise (SNR) region. In the case of multiple narrowband interferers superimposed with wideband signals, the cordless phone detection algorithm 100 employs the minimum distance method to estimate the bandwidth.

After obtaining the sliced data, X(t), performing the PSD estimation, Y(f, t), and performing bandwidth estimation, B(t*), the cordless phone detection algorithm 100 compares the bandwidth to a threshold value, $Th_1$ (block 108). The threshold value, $Th_1$, is the narrowband threshold. Compared to WLAN signals, all cordless phone signals are narrowband. The narrowband threshold, $Th_1$, is carefully selected such that the four types of cordless phones in Table 1 are characterized as narrowband. If the estimated bandwidth, B(t*) is less than the threshold, $Th_1$, the sampled spectrum data 300 is classified as narrowband (block 112). Otherwise, the sampled spectrum data 300 is considered to be a wideband signal or noise (block 110). Where no narrowband signal is detected in the spectrum data 300, no further actions are taken. Thus, the algorithm 100 is able to distinguish the sampled spectrum data 300 as either being narrowband or wideband at this stage (block 108).

Now that the algorithm 100 has separated the narrowband components of the sampled spectrum data 300 from the wideband components, the algorithm 100 classifies the data based on bandwidth, frame length, and inter-frame time.

Figure 5:
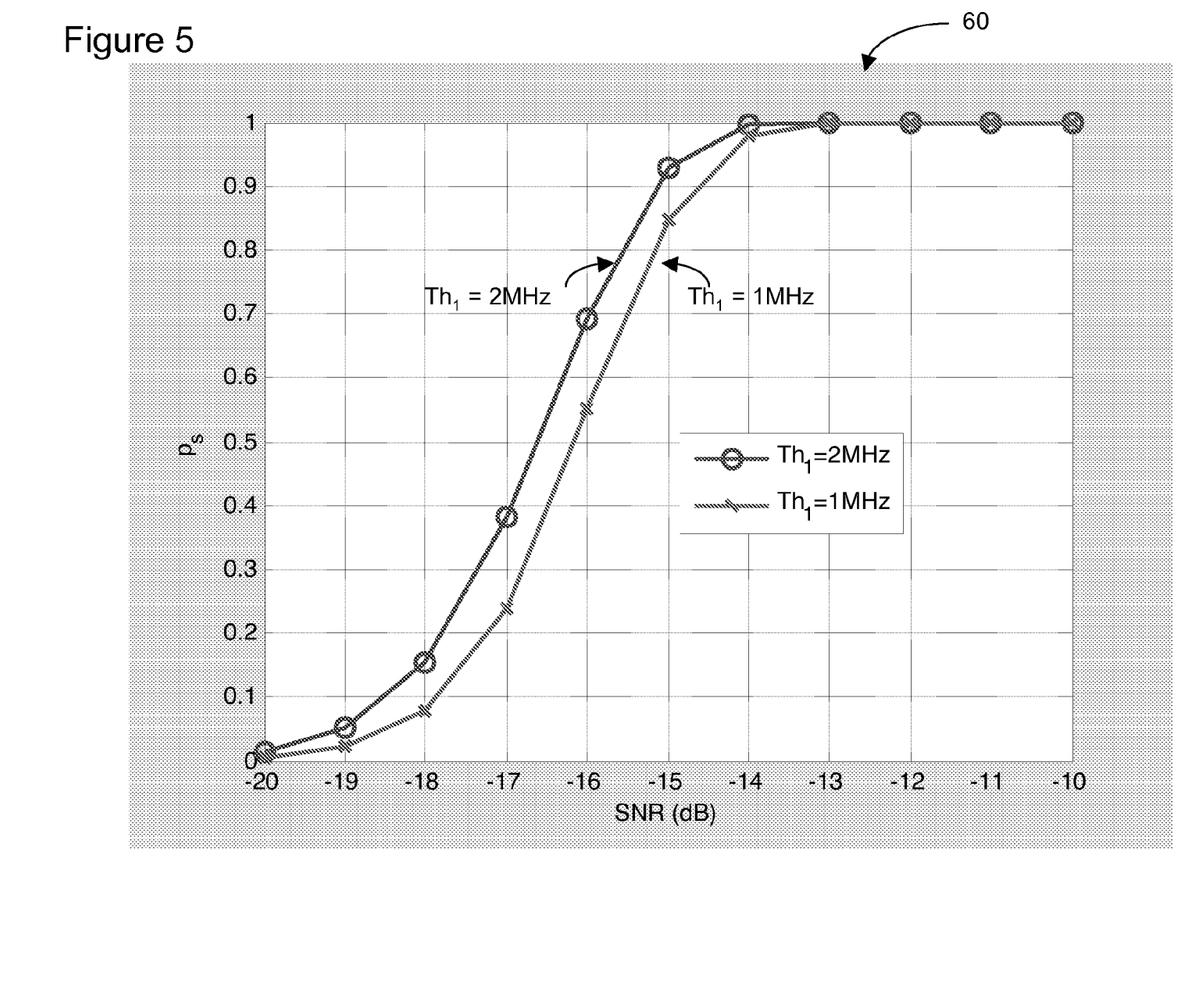
FIG. 5 is a graph showing a probability of successful narrowband extraction (when a data slice contains a narrowband signal) versus signal to noise ratio for two different threshold values, obtained by the algorithm of FIG. 1, according to some embodiments.

A probability, $p_s$, is defined as the probability of successful narrowband extraction when the data slice, X(t), contains a narrowband signal. The probability, $p_s$, is a function of the SNR, $Th_1$, N, and m. To quantify the performance with different parameters, the cordless phone detection algorithm 100 uses a Yule-Walker AR modeling method (also known as an autocorrelation method), and simulates $p_s$ for different $Th_1$, N and m. A graph 60 in FIG. 5 shows $p_s$ versus the SNR, with $Th_1$ at 2 MHz and at 1 MHz. Technically, the WDCT phones have a narrowband signal less than 1 MHz wide.

In some embodiments, the algorithm 100 tries to detect the WDCT phone 28 first, instead of the analog FM 22, digital FM 24, or DSSS 26 phones. The cordless phone detection algorithm 100 selects a WDCT slice sequence from the sliced data, X(t) (block 114). With the exception of the analog FM phone 22 (for which there is no frame length), the frame length, $t_f$, of the other cordless phones 24, 26, and 28 is known. Thus, instead of examining all slices, the cordless phone detection algorithm 100 selects the dominant narrowband interferer (DNI) slice every half-DNI frame length to create a slice sequence that includes the slice at t*. This reduces the computational complexity of the algorithm 100. The slice sequence has sufficient information to detect the DNI. Because the frame length, $t_f$, of WDCT phones 28 is longer (10 ms) than the frame length of other phones (see Table 1) and WDCT phones are the most dominant in the market, the WDCT sequence is examined first by the cordless phone detection algorithm 100.

Figure 6:
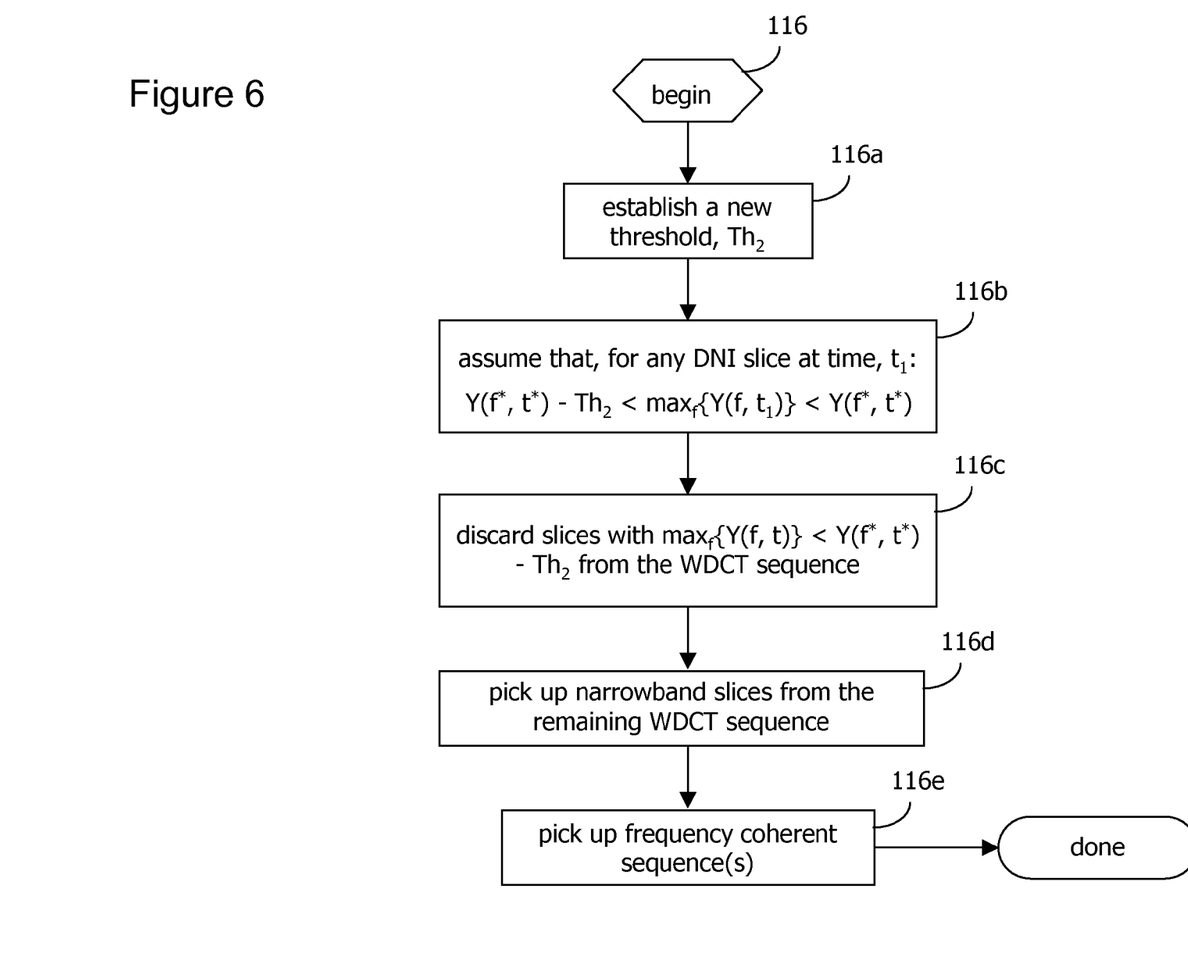
FIG. 6 is a flow diagram showing the operations of the algorithm of FIG. 1 to obtain DNI slices, according to some embodiments.

From the selected WDCT slice sequence, the algorithm 100 next picks up the DNI slices (block 116). FIG. 6 is a flow diagram showing the operations performed by the cordless phone detection algorithm 100 to obtain the DNI slices, according to some embodiments. This part of the algorithm 100 exploits certain characteristics of the WDCT frames. First, WDCT frames are frequency-hopping, whereas the other phones have static spectrum. The WDCT frame (spectrum data used to communicate between base and handset) will transmit at one frequency, then hop to another frequency, all over the 90 or 100 MHz spectrum of the ISM (industrial, scientific, and medical) band.

Although the WDCT frame frequency-hops, it remains at a given frequency for 10 ms. Further, half of the 10 ms is dedicated to four 1.25 usec time slots dedicated to transmission from the base of the WDCT phone (and reception to the handset), while the other half is dedicated to four 1.25 usec time slots transmission from the handset (and reception to the base). This means that, where a narrowband signal is detected, a second narrowband signal of the same frequency will be detected 5 ms later or earlier. These unique characteristics of the WDCT frames are a so-called "WDCT signature" and are the basis for the flow diagram of FIG. 6. The algorithm 100 attempts to extract two narrowband slices that are 5 ms apart.

In addition to WDCT frames, the algorithm 100 may pick up other narrowband signal components, such as Bluetooth, in the captured data. Thus, the algorithm 100 first sets a new threshold, $Th_2$ (block 116a). The algorithm 100 assumes that, for any DNI slice at time, $t_1$, the following formula is true (block 116b):

$$Y(f^*,t^*)-Th_2<\max\{Y(f,t_1)\}<Y(f^*,t^*) \qquad (8)$$

where $Y(f^*, t^*)$ equals $\max_{f,t}\{Y(f,t)\}$, at time slice, t*, and frequency component, f*. For example, where two data slices, at times t=1 and t=5 are taken, for each data slice, two frequencies are considered, $f_1$ and $f_2$. Suppose $Y(f_1,1)=1$, $Y(f_2,1)=2$, $Y(f_1,5)=4$ and $Y(f_2,5)=3$. Then, for the data slice at t=1, $\max_f\{Y(f,1)\}=Y(f_2,1)=2$; for the data slice at t=5, $\max_f\{Y(f,5)\}=Y(f_1,5)=4$. Accordingly, $\max_{f,t}\{Y(f,t)\}=Y(f_1,5)=4$. Equation (8) says, in essence, for any dominant narrowband interferer slice at a time, $t_1$, a maximum power density spectrum of the sampled spectrum data for the time, $t_1$, $\max\{Y(f,t_1)\}$, is between a maximum power density spectrum of the sampled spectrum data over all frequencies and times, $\max_{f,t}\{Y(f,t)\}$ (or, equivalently, $Y(f^*,t^*)$) minus the threshold value, $Th_2$, and the maximum power density spectrum of the sampled spectrum data over all frequencies and times, $\max_{f,t}\{Y(f,t)\}$.

If WDCT is detected as the DNI, the algorithm 100 assumes that, for any data slice containing WDCT, equation (8) is true. Further, any slice with the following characteristic is discarded from the WDCT sequence (block 116c), thus eliminating other narrowband signals whose PSD satisfies the equation:

$$\max\{Y(f,t)\}<Y(f^*,t^*)-Th_2 \qquad (9)$$

In other words, the algorithm 100 discards slices in which the maximum power density spectrum of the sampled spectrum data over all frequencies for a time, $\max_f\{Y(f,t)\}$, is less than the maximum power density spectrum of the sampled spectrum data over all frequencies and times, $Y(f^*,t^*)$ minus the threshold value, $Th_2$, from the WDCT slice sequence.

By discarding other narrowband signal components, the algorithm 100 avoids mistaking another narrowband signal component, such as Bluetooth, as being from a WDCT frame. The cordless phone detection algorithm 100 then picks up narrowband slices from the remaining WDCT sequence (block 116d) and picks up frequency coherence sequence(s) (block 116e).

Figure 7:
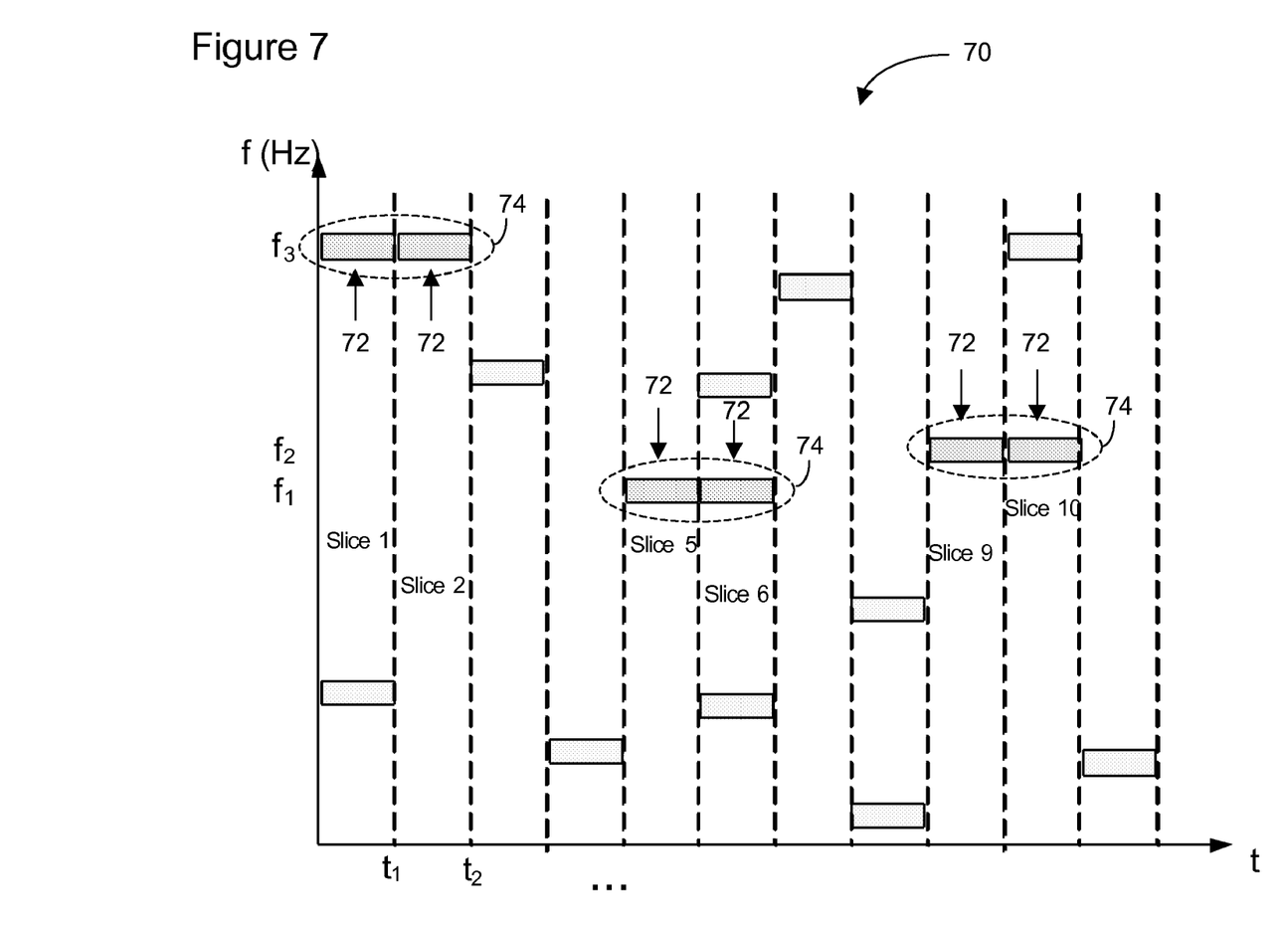
FIG. 7 is a diagram of sample slices used by the algorithm of FIG. 1, according to some embodiments.

As used herein, a frequency-coherent signal component (FCSC) is defined as a component that has the same center frequency and bandwidth as one of the signal components in its adjacent slice(s). A set of two or more FCSCs with the same central frequency is defined as an FCSC group. For example, in FIG. 7, a graph 70 shows the time versus frequency of eleven data slices. There are six FCSCs 72 and three FCSC groups 74, as shown. Multiple serial FCSC groups may form an FCSC sequence. Thus, the six FCSCs 72 (or the three FCSC groups 74) form an FCSC sequence, which is used to compare to the WDCT signature. If the DNI is a WDCT phone and there are at least two frames being captured, the cordless phone detection algorithm 100 may pick up an FCSC sequence from the WDCT phone. Thus, as shown in the flow diagram of FIG. 2, the algorithm 100 has picked up the FCSC sequence (block 116).

Having the extracted FCSC sequence, the algorithm 100 determines whether the sequence has a static spectrum or is a frequency hopper (block 118). The analog FM phones 22, the digital FM phones 24, and the DSSS phones 26 have static spectrum, while the WDCT phone is a frequency hopper (see Table 1). If the sequence has a static spectrum, the central frequency and bandwidth of the sequence is nearly constant. In other words, $$f_{cmax} - f_{cmin} < Th_3 \text{ and } b_{max} - b_{min} < Th_4 \quad (10)$$

where $f_c$ is the central frequency of a slice, $f_{cmax} = \max_t\{f_c(t)\}$, and $f_{cmin} = \min_t\{f_c(t)\}$.

Initially, the algorithm 100 sets the thresholds, $Th_3$ and $Th_4$, to be 1 MHz. To optimize the thresholds, $Th_3$ and $Th_4$, the standards for the detection of analog/digital FM and DSSS cordless phones are preferably obtained by the cordless phone detection algorithm 100.

If the sequence is a frequency hopper, the sampled spectrum data 300 may indicate a WDCT phone 28. Accordingly, the sequence is compared to that of known WDCT frames, or WDCT signature matching (block 122). The algorithm 100 may test several known WDCT signatures. If the sequence does not match any possible WDCT signatures, then the sampled spectrum data 300 is for a non-cordless phone device that employs FHSS, such as a Bluetooth device (block 126).

If, on the other hand, the FCSC sequence has a static spectrum (block 118), then the signal 300 may come from an analog FM phone 22, a digital FM phone 24, or a DSSS phone 26. The algorithm 100 re-selects the DNI slices (block 116) and performs the steps (see FIG. 6), this time excluding the WDCT phone, since the algorithm determined that the sampled spectrum data 300 is a static spectrum signal (block 120). This time, the DNI slices are selected every $t_f/2$, where $t_f$ is now the frame length of digital FM phones 24 or DSSS phones 26. In some embodiments, these phones 24 and 26 have a frame length, $t_f$, of 2 ms.

Again, the cordless phone detection algorithm 100 determines whether the sampled spectrum data 300 indicates a frequency-hopper or a spread spectrum signal (block 124). If a frequency-hopper, then the signal 300 is for a non-cordless phone device that employs FHSS, such as a Bluetooth device (block 126). Otherwise, the sampled spectrum data 300 is spread spectrum, and thus may be an analog FM phone 22, a digital FM phone 24, or a DSSS phone 26. Accordingly, the algorithm 100 matches the estimated bandwidth with bandwidths of known FM and DSSS phones to determine which type of phone the sampled spectrum data 300 is coming from (block 128).

In some embodiments, the cordless phone detection algorithm 100 is a software program executed by a processor. As used herein, the term "processor" may include any computing and/or processing component. For example, the processor may be a general-purpose processor, such as part of a computer system, as depicted in FIG. 8, according to some embodiments. Alternatively, the algorithm 100 may be executed by a digital signal processor (DSP) or by a field programmable gate array (FPGA), as other examples.

The system 200 is a processor-based system, including a processor 202, a memory 204, a chipset 206, non-volatile media 208, and a signal detection device 210. The processor 202 may include an applications processor of a wireless chipset, as one example. The memory 204 includes the buffer referred to above, and the algorithm 100 is stored in the non-volatile media 208, such as a disk drive, to be loaded into the memory 204 and executed by the processor 202. The signal detection device 210 is used to detect the sampled spectrum data 300 to be analyzed. The signal detection device 210 is shown as part of the processor-based system 200, but may alternatively be a distinct device coupled thereto.

In some embodiments, the cordless phone detection algorithm 100 is a software program executed within a wireless LAN device. The sampled spectrum data 300 is already detected by the wireless LAN, as part of its normal operation. The algorithm 100 is able to ascertain the presence or absence of cordless phones in the vicinity of the device, thus enhancing the capability of the device to overcome interference of such devices, whether by reporting the presence of the device on a competing channel, or by automatically updating the device (such as by changing an operating channel) so that interference no longer occurs.

The cordless phone detection algorithm 100 is thus a spectrum sensing algorithm that detects all types of 2.4 GHz cordless phones. Advantageously, the algorithm 100 may detect a narrowband interferer with a superimposed wideband signal in both the frequency domain and in the time domain (up to SNR=−13 dB). The algorithm 100 also may detect multiple narrowband interferers superimposed by a wideband signal. The algorithm 100 may be extended to detect other narrowband interferers, such as microwave ovens. The algorithm 100 also may be used in future WLAN systems, giving such systems the capability of spectrum sensing and enabling more intelligent interference mitigation schemes. The algorithm 100 enables the system 200 to have improved link quality and performance based on its ability to be aware of interference by cordless phones, and devise specific schemes to avoid such interference.

The cordless phone detection algorithm 100 may be combined with interference mitigation techniques. Successful detection of an interferer enables interference mitigation through physical layer as well as MAC layer adaptations. The algorithm 100 operates without a cordless phone receiver, as the algorithm relies on the sampled spectrum data.

While the disclosure has been described with respect to a limited number of embodiments, those skilled in the art will appreciate numerous modifications and variations therefrom. It is intended that the appended claims cover all such modifications and variations as fall within the true spirit and scope of the disclosed subject matter.

What is claimed is:

1. A method to detect cordless phones, the method comprising:
  obtaining sampled spectrum data and storing the sampled spectrum data in a buffer of a memory, wherein the memory is a component of a processor-based system, the sampled spectrum data comprising narrowband components and wideband components;
  separating the narrowband components from the wideband components; and
  analyzing the narrowband components for presence of a worldwide digital cordless telephone (WDCT) by:
    separating selected narrowband components from the narrowband components, wherein the selected narrowband components exceed a predetermined threshold;
    obtaining a plurality of frequency-coherent signal components (FCSCs) from adjacent time slices of the selected narrowband components, wherein each FCSC comprises a component that has the same center frequency and bandwidth as one of the signal components in its adjacent slice;
    extracting a distinct FCSC group from each pair of the plurality of FCSCs;
    extracting a distinct FCSC sequence from two or more distinct FCSC groups; and
    comparing the distinct FCSC sequence to a WDCT signature.

2. The method of claim 1, separating the narrowband components from the wideband components further comprising:
  periodically capturing a data slice of the sampled spectrum data, resulting in sliced data, $X(t)$, wherein the sliced data is in a time domain; and
  estimating a power spectrum density, $Y(f,t)$, of each sliced data, $X(t)$, in a frequency domain; and
  classifying the sampled spectrum data based on bandwidth, frame length, and inter-frame time of the sampled spectrum data by:
    performing bandwidth estimation, $B(t^*)$, of the data slice at a time, $t^*$, by:
      obtaining a highest point of the power spectrum density, $Y(f,t)$; and
      estimating the bandwidth by looking at frequencies between the highest point and a point three decibels below the highest point;
  wherein the sampled spectrum data is a dominant narrowband interferer if the estimated bandwidth at the time, $t^*$, is narrowband.

3. The method of claim 2, estimating a power spectrum density, $Y(f,t)$, of each sliced data, $X(t)$, in the frequency domain further comprising using a parametric method with autoregressive modeling to estimate the power spectrum density.

4. The method of claim 2, separating the narrowband components from the wideband components further comprising:
  comparing the bandwidth to a threshold bandwidth, wherein the threshold bandwidth is selected so that analog frequency modulation (FM) phones, digital FM phones, direct sequence spread spectrum (DSSS) phones, and worldwide digital cordless telecommunications (WDCT) phones are characterized as narrowband;
  wherein the sampled spectrum data is a narrowband signal if the bandwidth is lower than the threshold bandwidth and the sampled spectrum data is a wideband signal if the bandwidth exceeds or is equal to the threshold bandwidth.

5. The method of claim 4, classifying the sampled spectrum data based on bandwidth, frame length, and inter-frame time of the sampled spectrum data further comprising:
  selecting a worldwide digital cordless telecommunications (WDCT) slice sequence;
  extracting a frequency-coherent signal component from the WDCT slice sequence; and
  determining whether the signal component is static spectrum or frequency-hopping spread spectrum.

6. The method of claim 2, estimating a power spectrum density, $Y(f,t)$, of each sliced data, $X(t)$, in the frequency domain further comprising using a fast Fourier transform method to estimate the power spectrum density.

7. The method of claim 5, further comprising:
  determining that the signal component is a frequency-hopping spread spectrum component; and
  comparing the signal component to one or more WDCT signatures.

8. The method of claim 7, further comprising:
  determining that the signal component matches one or more WDCT signatures; and
  concluding that the sampled spectrum data is from a WDCT phone.

9. The method of claim 7, further comprising:
  determining that the signal component does not match one or more WDCT signatures; and
  concluding that the sampled spectrum data is from a non-cordless phone frequency-hopping spread spectrum device.

10. The method of claim 5, further comprising:
  determining that the signal component has a static spectrum, wherein the static spectrum indicates that the signal component is coming from an analog FM phone, a digital FM phone, or a DSSS phone, but not from a WDCT phone; and
  performing bandwidth matching of the signal component.

11. A system to determine a type of cordless phone from sampled spectrum data, the system comprising:
  a processor;
  a device to detect the sampled spectrum data, the sampled spectrum data having narrowband components and wideband components; and
  a software program to be loaded into a memory and executed by the processor, the software program, when executed, to:
    store the sampled spectrum data in the memory;
    separate the narrowband components from the wideband components of the sampled spectrum data;
    analyze the narrowband components for presence of a worldwide digital cordless telephone (WDCT) by:
      separating selected narrowband components from the narrowband components, wherein the selected narrowband components exceed a predetermined threshold;
      obtaining a plurality of frequency-coherent signal components (FCSCs) from adjacent time slices of the selected narrowband components, wherein each FCSC comprises a component that has the same center frequency and bandwidth as one of the signal components in its adjacent slice;
      extracting a distinct FCSC group from each pair of the plurality of FCSCs;
      extracting a distinct FCSC sequence from two or more distinct FCSC groups; and
      comparing the distinct FCSC sequence to a WDCT signature.

12. The system of claim 11, the software program, when executed, to separate the narrowband components from the wideband components of the sampled spectrum data by:
- periodically capture a data slice of the sampled spectrum data, resulting in sliced data, wherein the sliced data is in a time domain;
- estimate a power spectrum density of each sliced data in a frequency domain;
- compare the bandwidth to a threshold bandwidth, wherein the threshold bandwidth is selected so that analog frequency modulation (FM) phones, digital FM phones, direct sequence spread spectrum (DSSS) phones, and worldwide digital cordless telecommunications (WDCT) phones are characterized as narrowband, wherein the sampled spectrum data is a narrowband signal if the bandwidth is lower than the threshold bandwidth and the sampled spectrum data is a wideband signal if the bandwidth exceeds or is equal to the threshold bandwidth; and
- classify the sampled spectrum data based on bandwidth, frame length, and inter-frame time of the sampled spectrum data.

13. The system of claim 12, the software program, when executed, to further estimate a power spectrum density using a parametric method with autoregressive modeling.

14. The system of claim 13, the software program, when executed, to further estimate a power spectrum density using a parametric method with autoregressive modeling by:
- performing power spectrum density estimation of each sliced data, X(t), of the sampled spectrum data in the frequency domain, Y(f,t);
- obtaining a maximum, Y, using the following formula:

$$Y(f^*,t^*)=\max_{f,t}\{Y(f,t)\},$$

wherein $\max_{f,t}\{Y(f,t)\}$ is the maximum Y(f,t) maximized over both frequency, f, and time t, and Y(f,t) is the power density spectrum for each slice, X(t), of the sampled spectrum data.

15. The system of claim 14, the software program, when executed, to further estimate a power spectrum density using a fast Fourier transform.

16. The system of claim 15, the software program, when executed, to further:
- estimate a power spectrum density using a fast Fourier transform with spectral smoothing.

17. The system of claim 12, the software program, when executed, to further:
- determine that the signal component is frequency-hopping spread spectrum; and
- compare the signal component to one or more worldwide digital cordless telecommunications signatures.

18. The system of claim 17, the software program, when executed, to further:
- determine that the signal component matches one or more worldwide digital cordless telecommunications signatures; and
- conclude that the sampled spectrum data is from a worldwide digital cordless phone.

19. The system of claim 17, the software program, when executed, to further:
- determine that the signal component does not match one or more worldwide digital cordless telecommunications signatures; and
- conclude that the sampled spectrum data is from a non-cordless phone frequency-hopping spread spectrum device.

20. The system of claim 15, the software program, when executed, to further:
- determine that the signal component is static spectrum; and
- perform bandwidth matching of the signal component.

* * * * *